(12) United States Patent
Bazzo (10) Patent No.: US 12,162,199 B2
(45) Date of Patent: Dec. 10, 2024

(54) METHOD, APPARATUS AND PRESS FOR INJECTION MOULDING OF PLASTIC MATERIAL

(71) Applicant: INGLASS S.p.A., San Polo di Piave (IT)

(72) Inventor: Maurizio Bazzo, San Polo di Piave (IT)

(73) Assignee: INGLASS S.p.A., San Polo di Piave (IT)

( * ) Notice: Subject to any disclaimer, the term of this patent is extended or adjusted under 35 U.S.C. 154(b) by 928 days.

(21) Appl. No.: 15/940,039

(22) Filed: Mar. 29, 2018

(65) Prior Publication Data

US 2018/0281258 A1     Oct. 4, 2018

(30) Foreign Application Priority Data

Apr. 4, 2017   (IT) .......................... 102017000037002

(51) Int. Cl.
*B29C 45/77*   (2006.01)
*B29C 45/00*   (2006.01)
(Continued)

(52) U.S. Cl.
CPC .............. *B29C 45/77* (2013.01); *B29C 45/23* (2013.01); *B29C 45/0025* (2013.01);
(Continued)

(58) Field of Classification Search
CPC .. B29C 2945/7698; B29C 2945/76595; B29C 2945/7648; B29C 45/77
See application file for complete search history.

(56) References Cited

U.S. PATENT DOCUMENTS 6,589,039 B1 *   7/2003   Doughty ................. B29C 45/27
                                                264/328.8
8,828,291 B2   9/2014   Altonen et al.
(Continued)

FOREIGN PATENT DOCUMENTS

CN        105397994 A     3/2016
CN        105431274 A     3/2016
(Continued)

OTHER PUBLICATIONS

Italian Search Report dated Oct. 6, 2017 for application IT201700037002, 7 pages.
(Continued)

*Primary Examiner* — Emmanuel S Luk
*Assistant Examiner* — Victoria Bartlett
(74) *Attorney, Agent, or Firm* — RMCK Law Group PLC (57) ABSTRACT

A method, apparatus and press for the injection moulding of plastic material by a plurality of injectors connected to a distributor and provided with respective obturators movable between a closing condition and an opening condition in a controlled fashion. The injection pressure in the distributor is maintained substantially constant by an actuator which actuates a screw of the injection press, from a start of a filling step up to an end of a packing step of the plastic material into a cavity of a mould. A moulding cycle is entirely controlled by each injector, by managing the position/velocity/acceleration of the respective obturator, without affecting the other injectors.

9 Claims, 11 Drawing Sheets

(51) Int. Cl.
*B29C 45/23* (2006.01)
*B29C 45/26* (2006.01)

(52) U.S. Cl.
CPC ............ *B29C 2045/0032* (2013.01); *B29C 2045/238* (2013.01); *B29C 2045/2683* (2013.01); *B29C 2945/76187* (2013.01); *B29C 2945/76214* (2013.01); *B29C 2945/76498* (2013.01); *B29C 2945/76568* (2013.01); *B29C 2945/76595* (2013.01); *B29C 2945/76658* (2013.01); *B29C 2945/76859* (2013.01)

(56) References Cited

U.S. PATENT DOCUMENTS

| | | | | |
|---|---|---|---|---|
| 2005/0048162 | A1* | 3/2005 | Teng | H02K 7/00 425/574 |
| 2008/0199554 | A1* | 8/2008 | Manda | B22D 17/2272 425/192 R |
| 2015/0035188 | A1* | 2/2015 | Altonen | B29C 45/77 264/40.7 |
| 2015/0266216 | A1* | 9/2015 | Bazzo | B29C 45/0046 264/328.12 |
| 2016/0167264 | A1 | 6/2016 | Bazzo | |
| 2016/0167271 | A1 | 6/2016 | Bazzo | |
| 2016/0288389 | A1* | 10/2016 | Olaru | B29C 45/2806 |
| 2018/0022002 | A1* | 1/2018 | Moss | B29C 45/762 425/146 |

FOREIGN PATENT DOCUMENTS

| | | |
|---|---|---|
| EP | 3135454 A1 | 3/2017 |
| JP | s58142833 A | 8/1983 |
| JP | 2016198925 A | 12/2016 |
| KR | 20030052120 A | 6/2003 |
| KR | 20160025027 A | 3/2016 |

OTHER PUBLICATIONS

Chinese Office Action dated Dec. 29, 2020. 8 pages.
Office Action and references cited therein, issued on Mar. 2, 2021 in connection with Japanese Application No. 2018-047332.
Office Action and references cited therein, issued on Mar. 19, 2021 in connection with South Korean Application No. 10-2018-0038175.
1st Office Action and references cited therein, issued on Jun. 10, 2022 in connection with German Application No. 102018107870.6. 6 pages.

* cited by examiner

METHOD, APPARATUS AND PRESS FOR INJECTION MOULDING OF PLASTIC MATERIAL

CROSS REFERENCE TO RELATED APPLICATIONS

This application claims priority to Italian Patent Application No. 102017000037002 filed on Apr. 4, 2017, the entire disclosure of which is incorporated herein by reference.

FIELD OF THE INVENTION

The present invention regards a method and an apparatus for the injection moulding of plastic materials of the type in which there is provided at least one nozzle for introducing the fluid plastic material under pressure into the cavity of a mould.

More in particular, the invention regards a method and a moulding apparatus that provide for a plurality of injectors connected to a hot runner or distributor and provided with respective obturators that are movable between a closing condition and an opening condition and they are actuated in a sequential or cascade fashion, in a controlled fashion with respect to at least one among position, velocity and acceleration of such obturators.

STATE OF THE PRIOR ART

Injection moulding systems thus made are manufactured and sold by the Applicant under the trade name FLEXflow and they are for example described in document number US-2016/167264 on behalf of the Applicant. Typically, the plastic material is supplied to the distributor by an injection press comprising a screw axially displaceable by means of an actuator, for example consisting of a hydraulic cylinder, and the injection moulding cycle provides for a filling step for introducing the plastic material into the cavity of the mould by the injectors, followed by a packing step of the plastic material introduced into the mould. Then there follows the cooling and removal of the moulded piece from the mould.

Conventionally, filling provides for injecting a given volume of plastic material over a given period of time, with the aim of filling the cavity of the mould completely.

Then, the so-called injection "velocity control" is actually carried out on the screw of the press, while the injection pressure, i.e. the pressure of the plastic material flowing out from the injection press and flowing into the distributor, will have an ensuing but non-controllable development. The value of the injection pressure can be calculated indirectly based on the hydraulic pressure of the cylinder of the press and the diameter of the screw: there is a linear correlation between the hydraulic pressure and the injection pressure.

At the end of the filling step there follows switching from injection "velocity control" to "pressure control" and then there follows the packing step. The main switching systems are volumetric, hydraulic, timed or based on feedback sensors arranged in the moulding cavity.

A constant injection pressure profile, thanks to which the injected material is kept under pressure to compensate shrinking due to cooling, to harmonise the filling of the cavity and to reduce internal tensions, is set during the packing step. The amount of plastic material required in this step is usually very limited with respect to the filling step.

With particular reference to the sequential moulding of considerably large components, in which the distributor conveys the material coming from the press to the various injection points, it should be observed that the injection pressure flowing out from the nozzle of the press and recorded in the distributor, conventionally changes instant by instant in particular during the filling step. Thus, the behaviour of the obturator of each injector affects the operating conditions of all other injectors (communicating vessels effect), thus complicating the management of the process in that it entails the need for constant re-adjustments.

Clearly, the management challenges increase proportionally to the number of injecting points and this is more clearly observable in case obturators of the on/off type for example with fluid actuation, which do not generally allow any type of control on the position, velocity or acceleration for opening and closing the obturators, contrary to actuation using electronic control electric motors.

Figure 1:
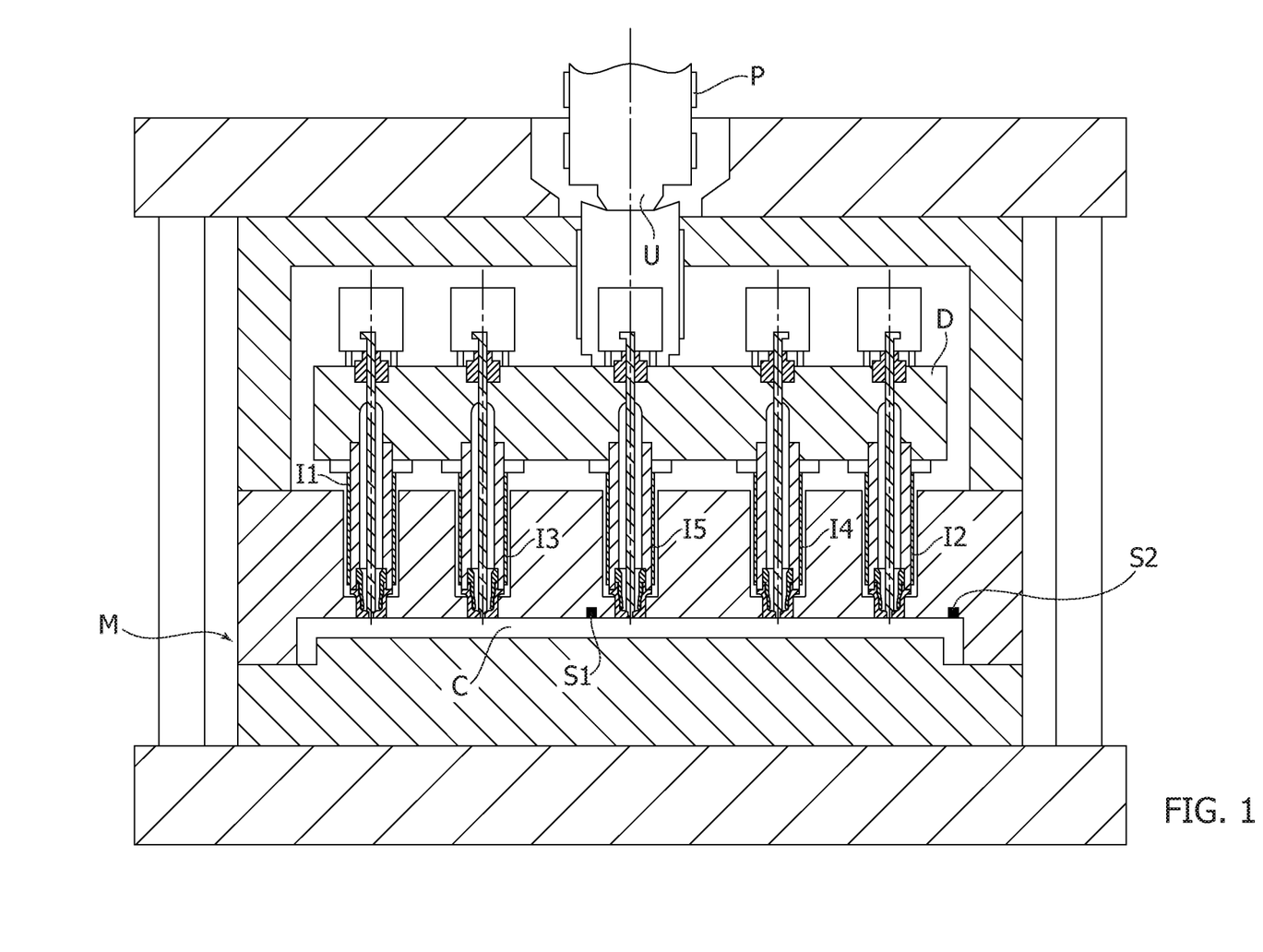
FIG. 1 is a cross-sectional schematic view of an example of a sequential injection moulding apparatus.

FIG. 1 of the attached drawings is a cross-sectional schematic view of a sequential injection moulding apparatus of a component, for example a lens of a vehicle light component, through five injection points I1, I2, I3, I4 and I5 arranged substantially in line. Each point consists of an injector made up of—in a known manner—a nozzle in which there is axially movable, between a closing position and an opening position, an obturator equipped with a stem and connected to a distributor D in turn supplied by the screw of the injection press P. The distributor D is preferably configured and structured in a manner such that the injection pressure at the inlet of the injectors I1-I5 is substantially unvaried.

Two pressure sensors S1, S2 facing the cavity C of the mould M enable to indirectly analyse the quality of the moulding process, identifying the occurrence of possible defects.

Figure 2:
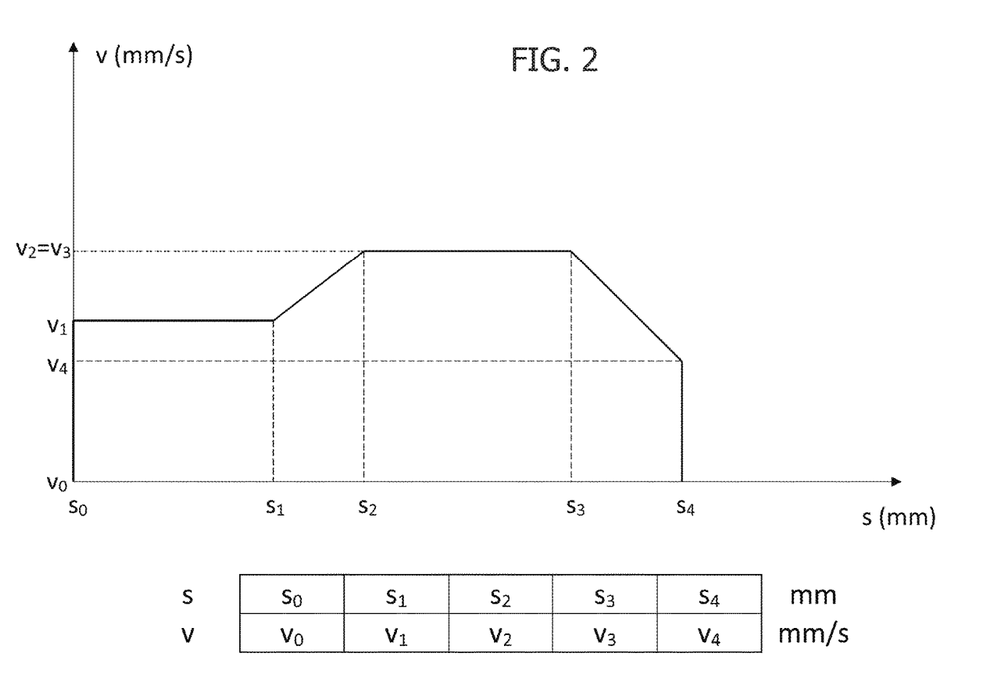
FIGS. 2 to 8 are charts and diagrams regarding the state of the art described previously.
Figure 3:
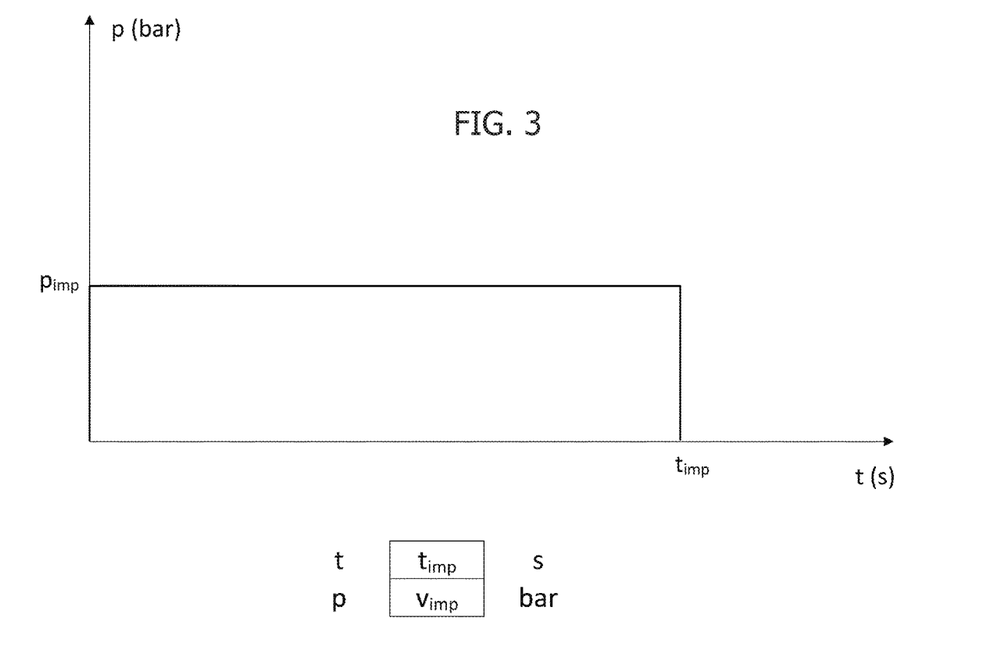
Figure 4:
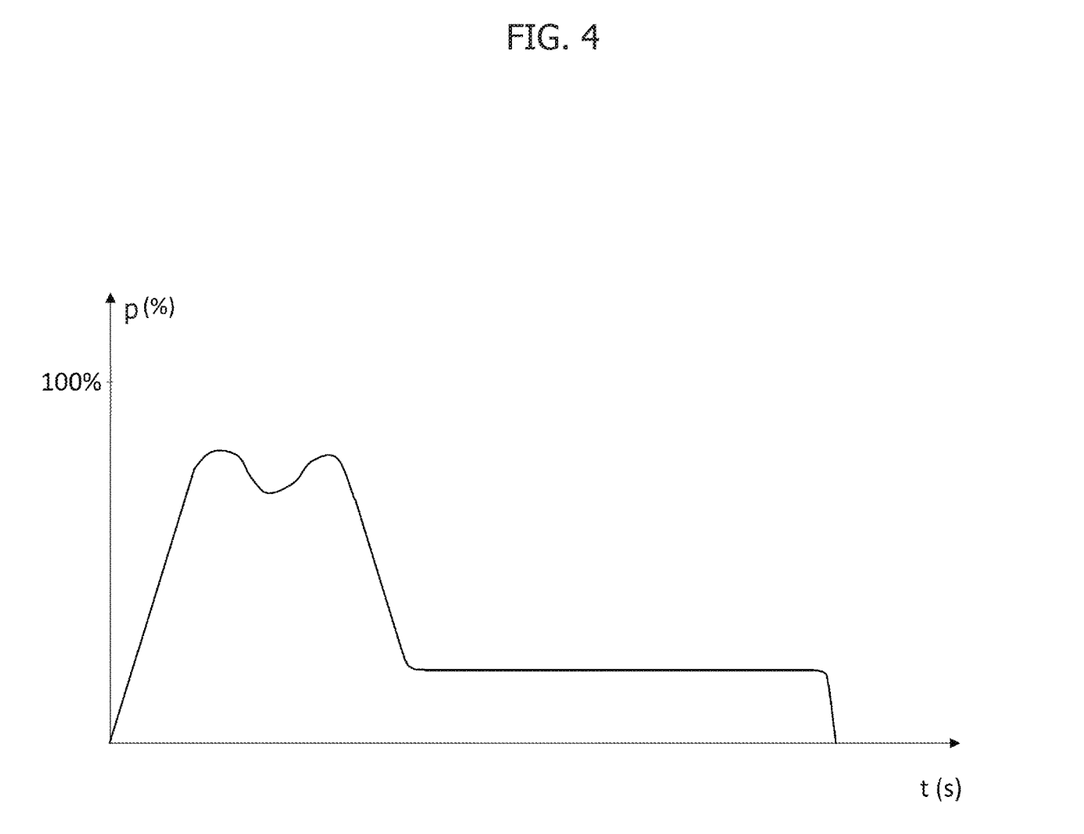

The charts of FIGS. 2, 3 and 4 respectively show the injection velocity profile set during the filling step, the injection pressure profile set during the packing step and the ensuing development of the injection pressure during the entire process. In the chart of FIG. 4 the development of the injection pressure is represented in terms of hydraulic pressure of the injection pressure (which, as mentioned, is directly proportional to the injection pressure) by percentage, obtainable from the control panel of the press and referring to the case of sequential injection using on/off actuators without controlling the position and/or velocity and/or acceleration for opening/closing the relative obturators. For example, if the 100% hydraulic pressure is in the order of 250 bars, the corresponding injection pressure detected by the sensors S1, S2 may be in the order of 1,500 bars.

Figure 5:
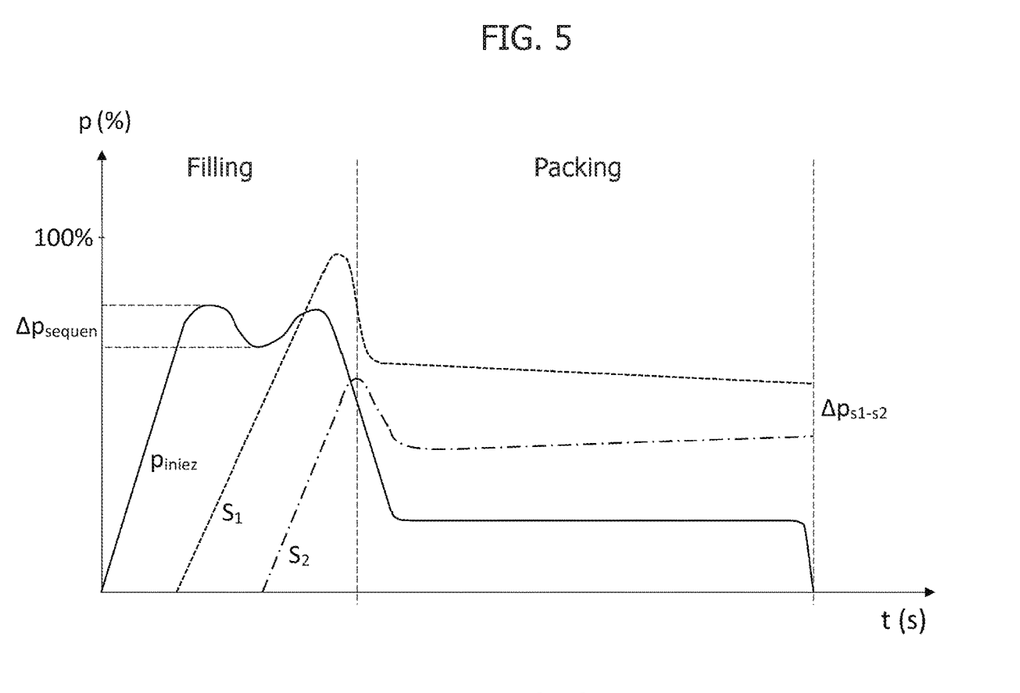
Figure 6:
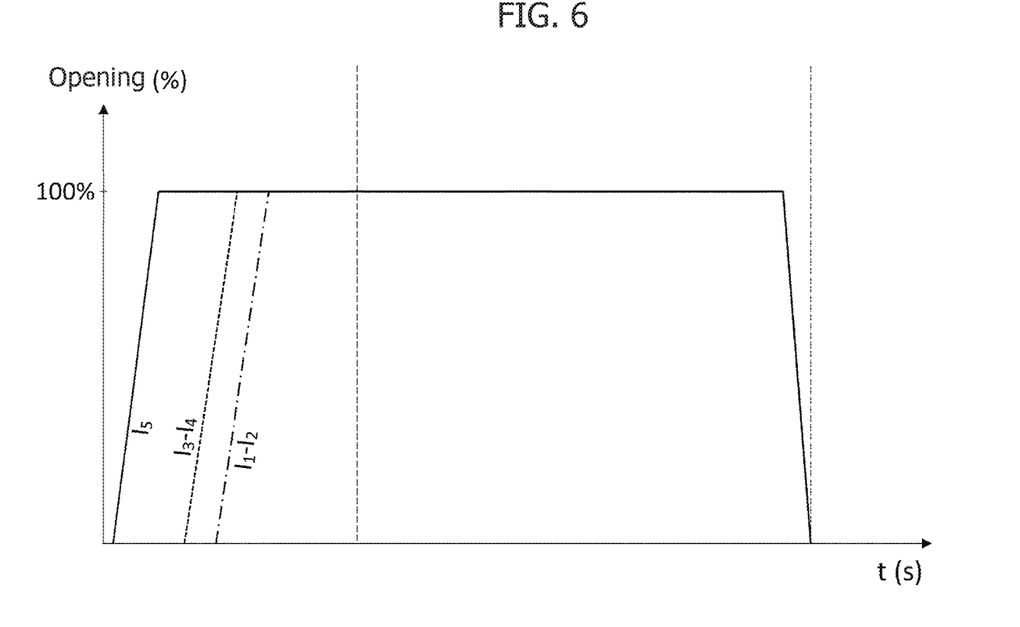

The chart of FIG. 5 represents the development of the injection pressure, as specified above, compared with the pressure recorded in the cavity by the two pressure sensors S1, S2. The chart of FIG. 6 shows the opening and closing sequence of the single injectors I1-I5.

The following defects can be observed:
 injection pressure drop towards the end of the filling step, due to the sequential opening of the various obturators;
 rapidly reaching high pressure peaks in the cavity, with ensuing aesthetic defects in proximity of the "gate";
 after the peak, the pressure drops to lower values in the packing step;
 a considerable residual pressure difference between the two points in the cavity corresponding to the sensors S1, S2 at the end of the packing step: a clear sign that the moulding of the piece was not uniform.

All defects listed above somehow arise from the moulding process management challenges, due to the constant variation of injection pressure in the distributor D and the mutual effect among the injectors (communicating vessels effect): for example, the opening of the injectors I3 and I4, subsequent to I5, progressively reduces the injection pressure (and thus the flow rate) of I5.

Figure 7:
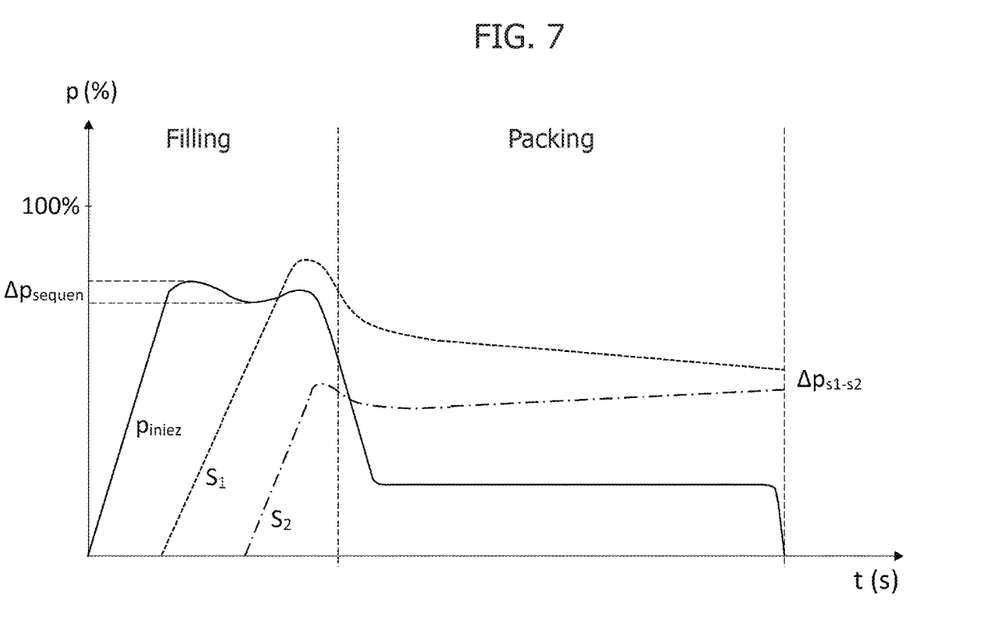
Figure 8:
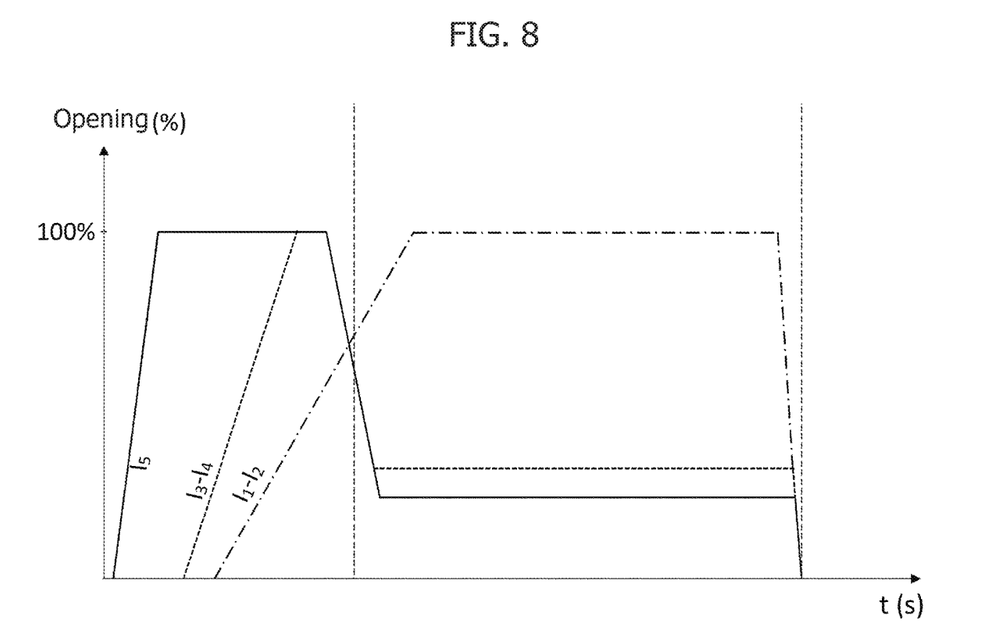

Using actuators consisting of electronic control electric motors, capable of controlling the position, velocity or acceleration of the single obturators, generally enables reducing the defects observed previously, as exemplified in FIGS. 7 and 8. As observable:

injection pressure drop is less evident;
pressure peaks in the cavity are less high;
the pressure difference ($\Delta_{pS1-S2}$) at the end of the packing between the two points in the cavity is smaller.

However, the mutual effect between the injectors I1-I5, due to the constant pressure variation in the distributor D, enables eliminating the defects entirely.

SUMMARY OF THE INVENTION

The object of the invention is to overcome the aforementioned drawbacks, and more in particular to provide an injection moulding method and apparatus of the type defined above, configured so as to overcome the problem regarding the mutual effect between the injectors actuated sequentially or in cascade fashion.

According to the invention, this object is primarily attained thanks to an injection moulding method according to claim 1, i.e. wherein the filling step for introducing the plastic material into the mould is carried out by means of a plurality of injectors connected to a hot runner or distributor and provided with respective obturators movable between a closing condition and an opening condition in a controlled fashion with respect to at least one among position, velocity and acceleration, wherein the plastic material is supplied to the distributor by an injection press comprising a screw axially displaceable by means of an actuator, and wherein the plastic material supplied to the distributor is at an injection pressure, whose peculiar characteristic lies in the fact that the injection pressure supplied to the distributor is kept substantially constant by means of the said actuator from the start of the filling step up to the end of the plastic material packing step.

Keeping the injection pressure supplied to the distributor constant during the entire moulding process (filling and packing) enables managing each injector separately and independently without any effect on the other injectors, i.e. as if it were the only injection point of the system. This is the very same effect that occurs for example between an aqueduct and various appliances: the aqueduct supplies the same constant pressure to all appliances, so that the opening of the gate valve of a first appliance does not entail any pressure and flow rate drop for the gate valve of a second appliance.

The injection press, in particular through the variations of the position and advancement velocity of the injection screw, automatically reacts to the openings of the injectors and the ensuing pressure excursions thus always guaranteeing the constant pressure condition in the distributor. Thus, controlling the injection pressure and/or flow rate flowing out from an injector does not affect the control of pressure and/or flow rate flowing out from the other injectors in any manner whatsoever.

The supplied injection pressure is conveniently the maximum pressure, in the sense that it is the peak pressure achieved in cases where the moulding of the same article is carried out applying conventional methods.

Each injector conventionally comprises a nozzle in which the terminal of the relative obturator moves. For example, as described and illustrated in document US-2016/0167271 on behalf of the Applicant, the nozzle is provided with a tip. Considering the same shape of the tip and of the obturator, the position (and velocity/acceleration) of each obturator is varied to adjust the flow rate and pressure constantly flowing out from the single nozzle during the entire cycle. Actually, interventions are made on head losses between the nozzle and the obturator.

Preferably, the distributor is configured in a manner such that the injection pressure at the inlet of each injector remains substantially unvaried. This is obtained by balancing the head losses of each channel, designated for a respective injector, in which the molten plastic material flows.

The balancing can be "natural", should the distributors have a symmetry (e.g. same lengths and same diameters of the channels), or "numeric" in absence of symmetries. In this case, interventions are for example made on variations of the diameters of some channels with the aim of compensating the differences in length and thus substantially obtaining the same head losses between the inlet of the distributor and the inlet of each injector.

Should the distributor not be balanced and the injection pressure flowing into each injector be different, this has to be taken into account when varying the position (and velocity/acceleration) of each obturator.

It should be observed that the crucial advantage arising from the invention lies in the fact that the position of each injector and its condition (partial/full opening, closure) have no effect on the other injectors in any manner whatsoever, irrespective of their number, position and condition.

The invention also regards an injection moulding apparatus configured for implementing the method and an injection press, comprising a rotatable screw and axially displaceable by means of an actuator controlled to implement the method. The actuator is preferably of the hydraulic or, alternatively, of the electric type. In particular, the hydraulic circuit for supplying the cylinder of the hydraulic actuator of the press, in which the piston for actuating the screw is movable, is conveniently connected to a control unit which detects the pressure drop at the end of the nozzle of the press or, alternatively and/or combined, in the hydraulic circuit of the cylinder and manages the advancement of the screw up to the position required to restore the injection pressure in the distributor, with pre-established velocity/acceleration. The hydraulic circuit pump may also be associated to a VFD ("variable frequency drive") control for modulating the rotation velocity thereof, and directional-control, solenoid-control, electro-hydraulic control or servo-control valves may be arranged in the circuit.

BRIEF DESCRIPTION OF THE DRAWINGS

The invention will now be described in detail with reference to the attached drawings, provided purely by way of non-limiting example, wherein:

FIG. 16 shows a further variant of FIG. 1, and FIG. 17 schematically shows an example of the injection press according to the invention.

DETAILED DESCRIPTION OF THE INVENTION

Figure 17:
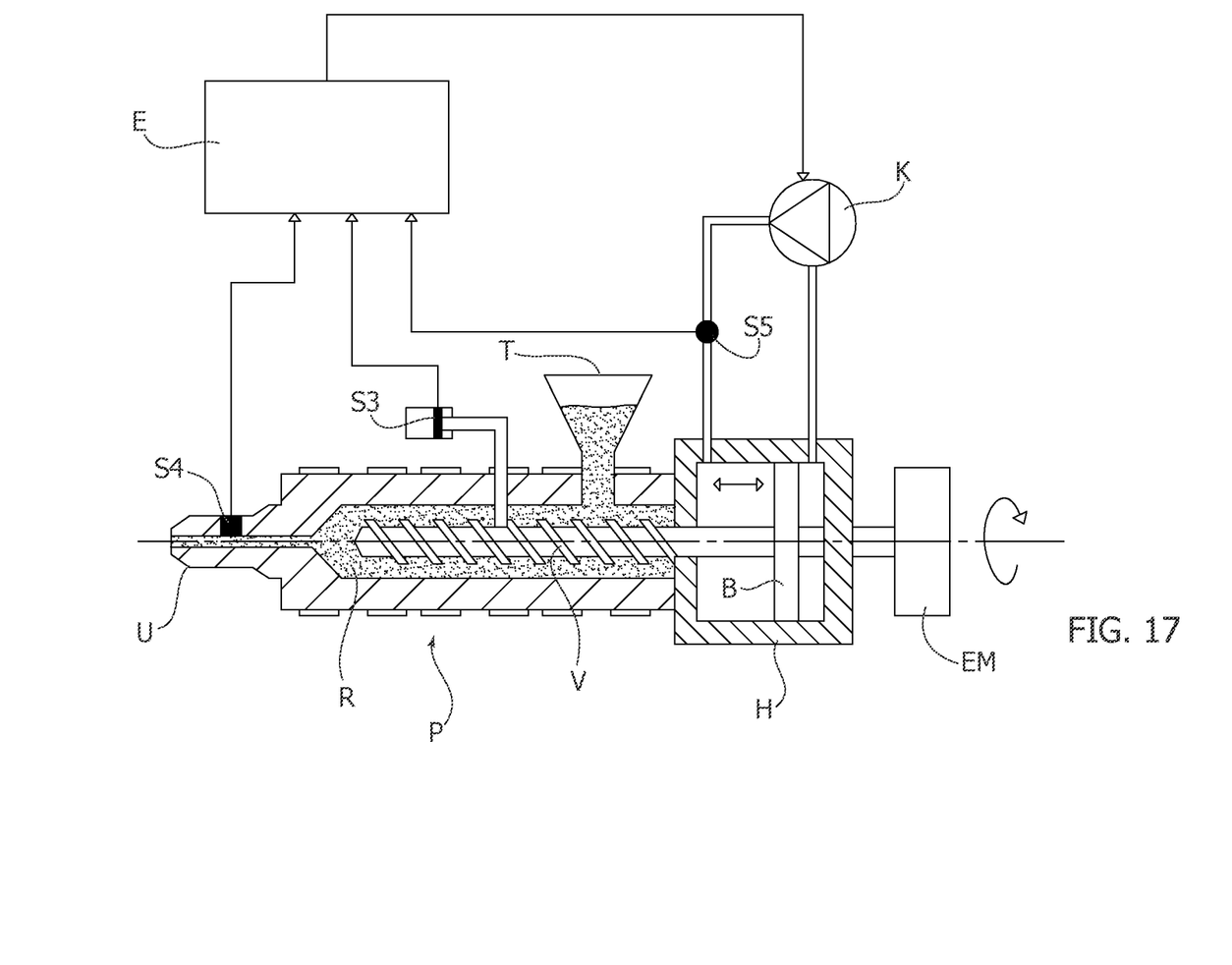

The diagram of FIG. 17 exemplifies the injection press P of the apparatus according to the invention. It comprises, in a known manner, a plastification and supply screw V movable in a hot chamber R in which the granules of the thermoplastic polymer to be moulded are supplied by means of a hopper T. The screw V is driven in rotation by an electric motor EM and it is connected to the piston B of a hydraulic cylinder H which controls the translation thereof in the hot chamber R. The cylinder H is connected to a hydraulic cylinder including, in a known manner, a pump K and solenoid valves not illustrated controlled by an electronic unit E. The pump K may be associated to a VFD (variable-frequency-drive) control for modulating the rotation velocity.

The outflow nozzle of the press P, indicated with U, supplies the fluidified plastic material to the distributor or hot runner D of FIG. 1: to this end, the advancement of the screw V is controlled by the electronic unit E which receives—in input—the signals of a position sensor S3 of the screw V, as well as the signals of a pressure sensor S4 located at the end of the nozzle U of the press P immediately upstream of the inlet of the distributor D and/or of a pressure sensor S5 provided for in the hydraulic circuit of the cylinder H. When the sensor S4 and/or the sensor S5 detect a pressure drop, the electronic unit E guides the hydraulic circuit so as to control the advancement—by means of the piston B—of the screw V, which translates up to the pre-established position, detected by the position sensor S3, with velocity/acceleration controlled.

Thus, the injection press P is configured, according to the peculiar characteristic of the invention, to provide an almost constant injection pressure during the entire injection moulding process, from the start of the introduction step up to the end of the packing step.

In this manner, the distributor D is kept at constant pressure (and temperature) and each injector I can be managed separately without affecting the others in any manner whatsoever, as if it were the only injection point of the system. The electronic control—carried out in a per se known manner—of the position and/or of the velocity of opening/closing and/or of the acceleration of the obturator of each injector enables to adjust the injection pressure and/or flow rate of the plastic material sequentially introduced into the cavity of the mould by each nozzle. The position of the obturator of each injector and its condition (partial/full opening, closure) does not affect the other injectors in any manner whatsoever, irrespective of their number, position and condition.

The press P, in particular through variations in the position and velocity of the injection screw V, automatically reacts to the opening of the injectors I so as to always guarantee the constant pressure condition in the distributor D. The constant injection pressure is preferably the peak pressure achieved should the moulding of the component be carried out by means of conventional methods.

Considering the same shape of the nozzle and of the obturator of each injector, the position (and velocity/acceleration) of the obturator is varied to adjust the flow rate and pressure constantly flowing out from the single nozzle during the entire cycle. Actually, interventions are made on head losses between the nozzle and the obturator, in particular between the tip and the obturator.

Figure 9:
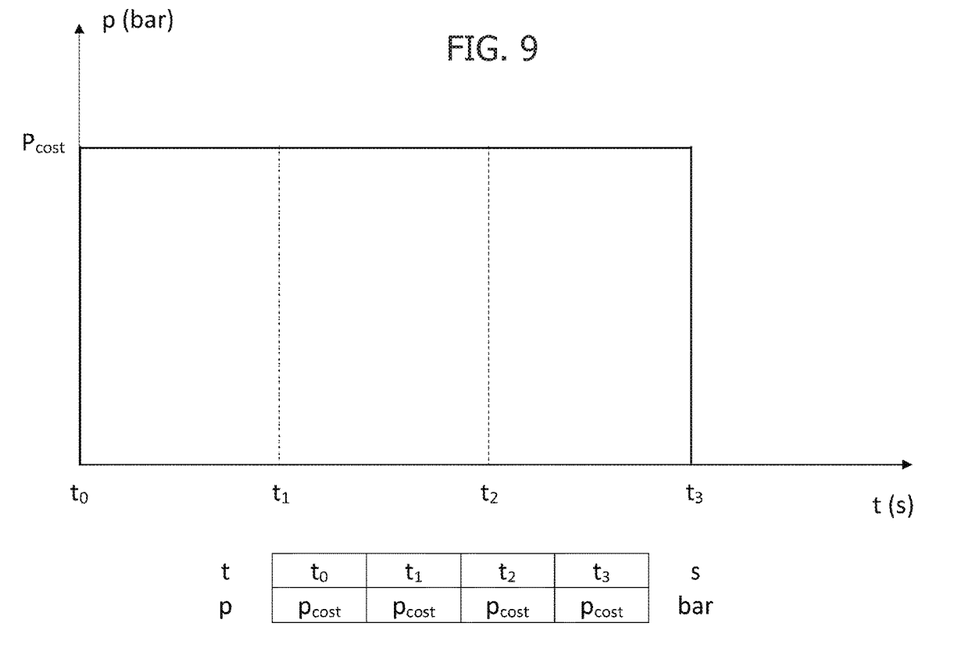
FIGS. 9 to 13 are similar representative diagrams of the invention.
Figure 10:
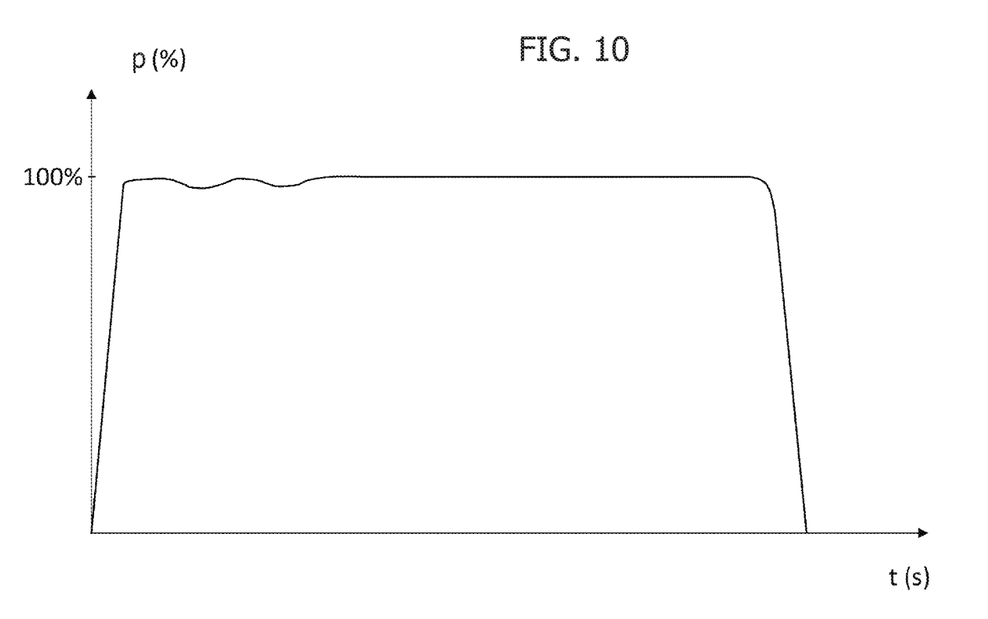

FIG. 9 is a diagram showing the development of the injection pressure during a moulding cycle carried out according to the invention, typically with injectors whose obturators are actuated by electronic control electric motors: as observable, the injection pressure remains constant, at the value corresponding to the hydraulic pressure set by means of the injection pressure P and represented in the diagram of FIG. 10. Such hydraulic pressure, except for slight pressure drop due to the sequential openings of the injectors only, is also substantially constant, contrary to what is represented in FIG. 4 with reference to the state of the art. Comparing the diagrams of FIGS. 4 and 10 it is overtly clear that thanks to the invention, the passage between the filling step and the packing step can no longer be identified: the management of the packing pressure, actually the management of the entire process, actually goes from the press P to the single injectors I, operating on the opening/closing of the respective obturators.

Figure 11:
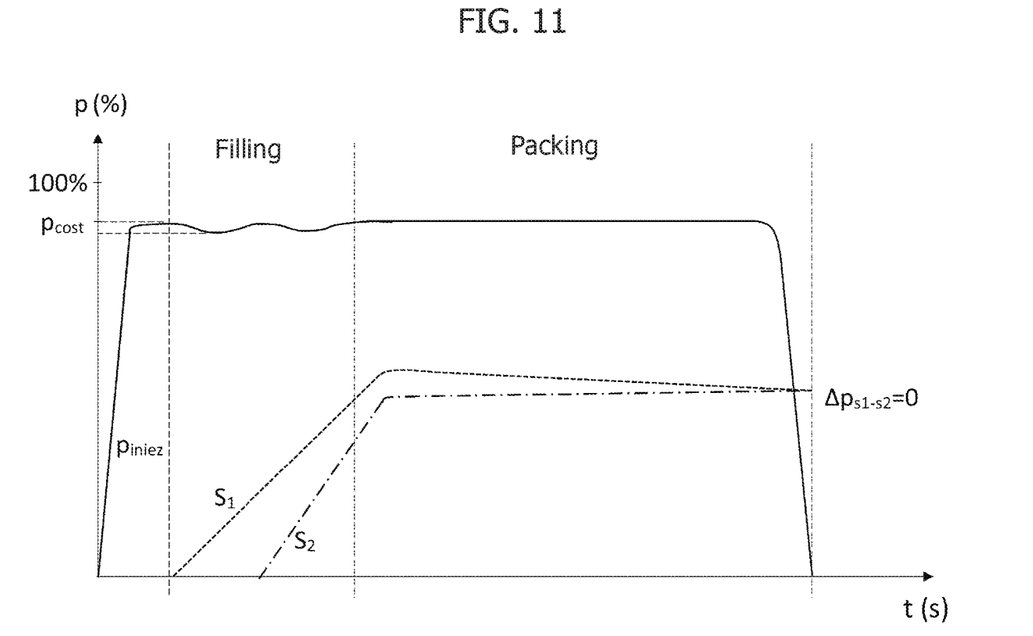
Figure 12:
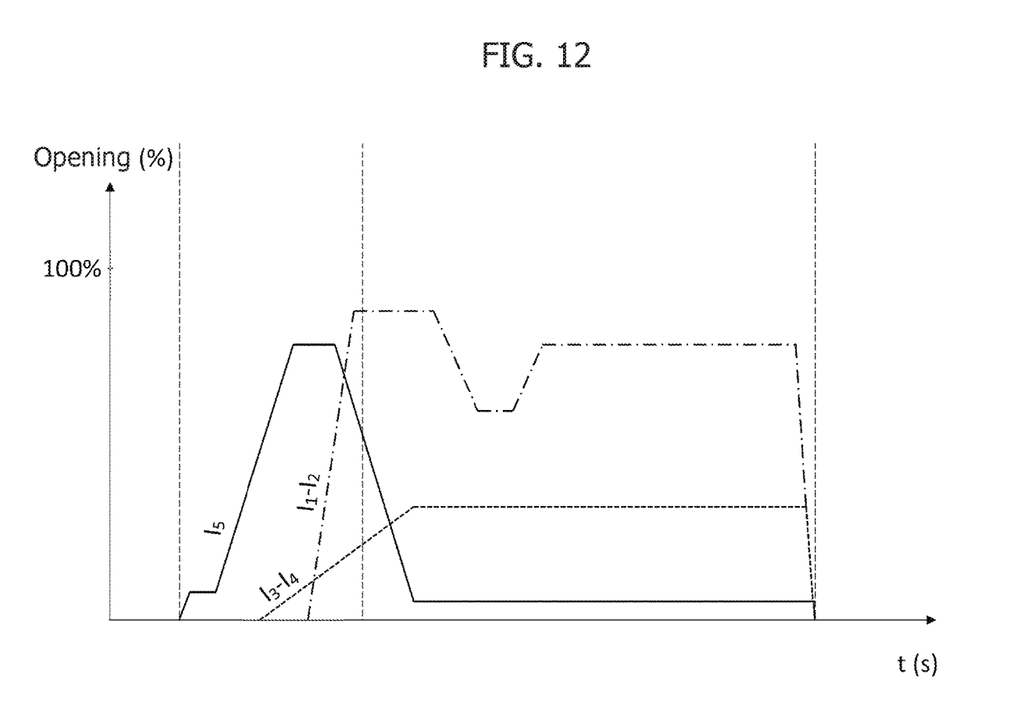

FIGS. 11 and 12 are diagrams similar to FIGS. 5 and 6 which show the development of the pressure in the cavity C of the mould M recorded by the sensors S1 and S2 of FIG. 1. It is clear that the increase of pressure in the cavity is almost linear and low up to stabilising at a packing value, while it used to be sudden up to a higher peak value, before dropping to the packing value, in the conventional cases.

The development according to the invention implies an optimal control of the moulding process, carried out by controlling the obturators of the injectors I1-I5. Furthermore, the pressure difference in the cavity at the end of the packing ($\Delta_{pS1-S2}$), previously considerable, is now almost absent, meaning that the moulded article is homogeneous.

The chart of FIG. 12, regarding the opening of the obturators of the injectors I1-I5, also shows that the central injector I5 is conveniently initially opened at a height proximal to the closure height and held in such position to partially discharge the injection pressure which entirely pushes thereon, thus avoiding the formation of localised defects.

Figure 13:
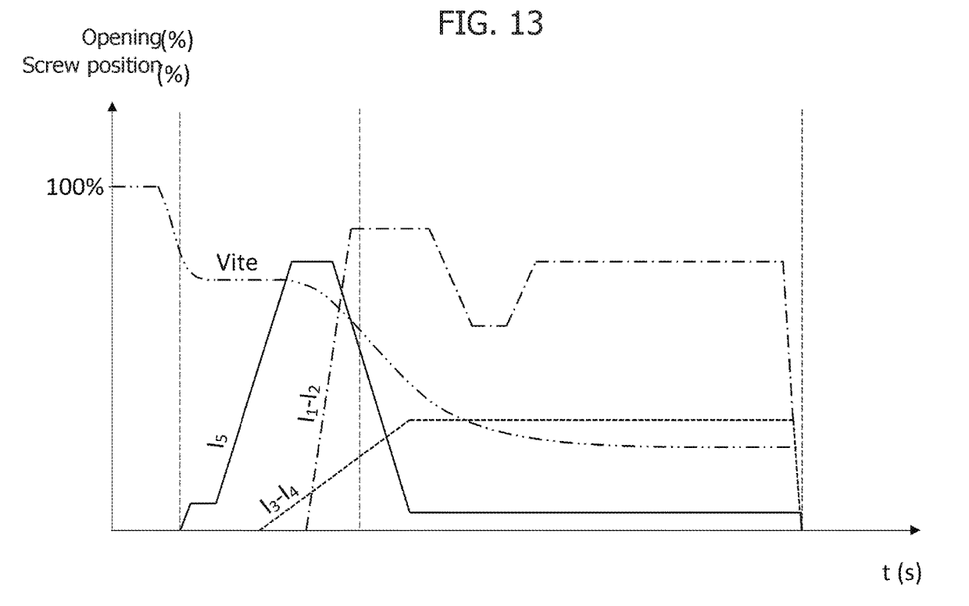

The chart of FIG. 13 shows—indicatively with a dashed and double dotted line—the reaction of the press P, in form of the position of the injection screw V, following openings of the various injectors I1-I5 with the aim of guaranteeing constant pressure in the distributor.

Figure 14:
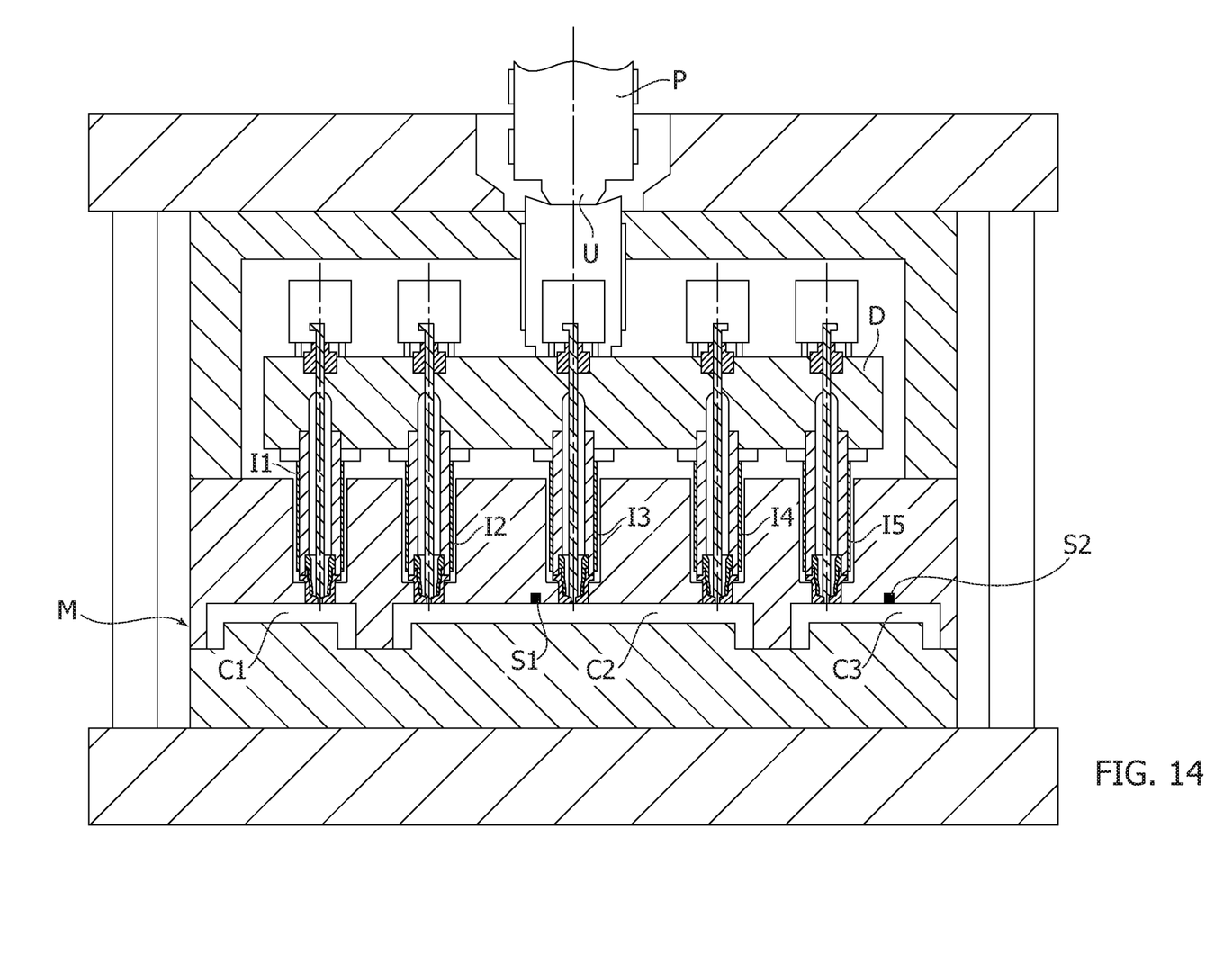
FIG. 14 shows a variant of FIG. 1.

FIG. 14, similar to FIG. 1, exemplifies an alternative embodiment of the invention applied to a "family mould", i.e. for the co-moulding of components of a same family, having different shapes and/or dimensions and/or volumes, with a multi-cavity mould C1, C2, C3 and respective injectors I1-I5 associated to such cavities. In this case, it is clear that the invention enables managing different packing pressures/flow rates in the single cavities C1-C3, though maintaining the same pressure in the distributor D.

Figure 15:
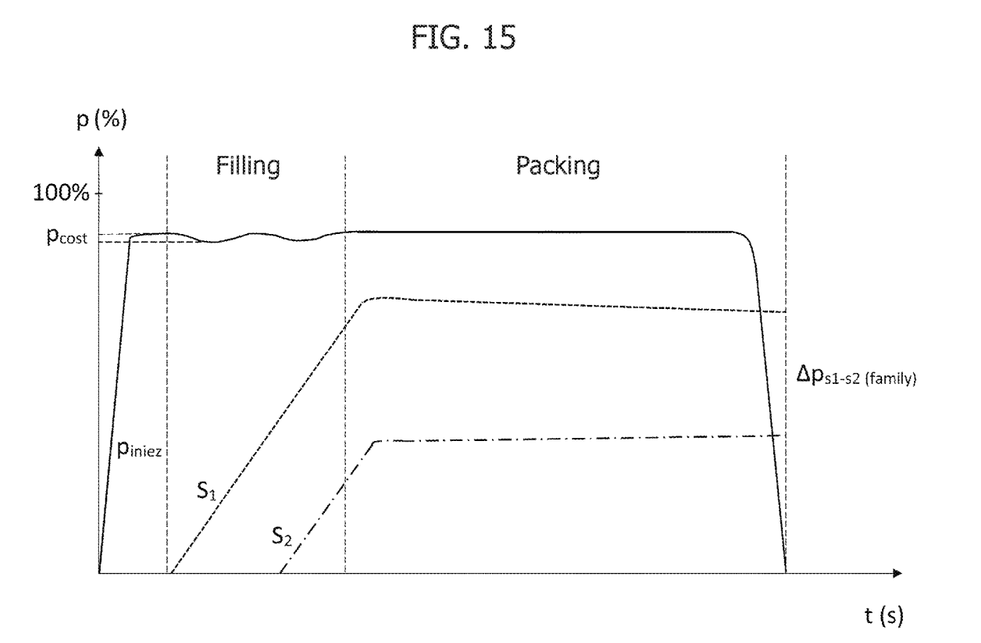
FIG. 15 is a diagram similar to FIG. 11 referring to the variant of FIG. 14.

For example, the sensor S2 is combined with a cavity C3 of smaller dimensions with respect to the cavity C2 to which the sensor S1 is associated, and thus requires a lower packing pressure, as represented in the diagram of FIG. 15, by means of the control of the relative injector I5.

Figure 16:
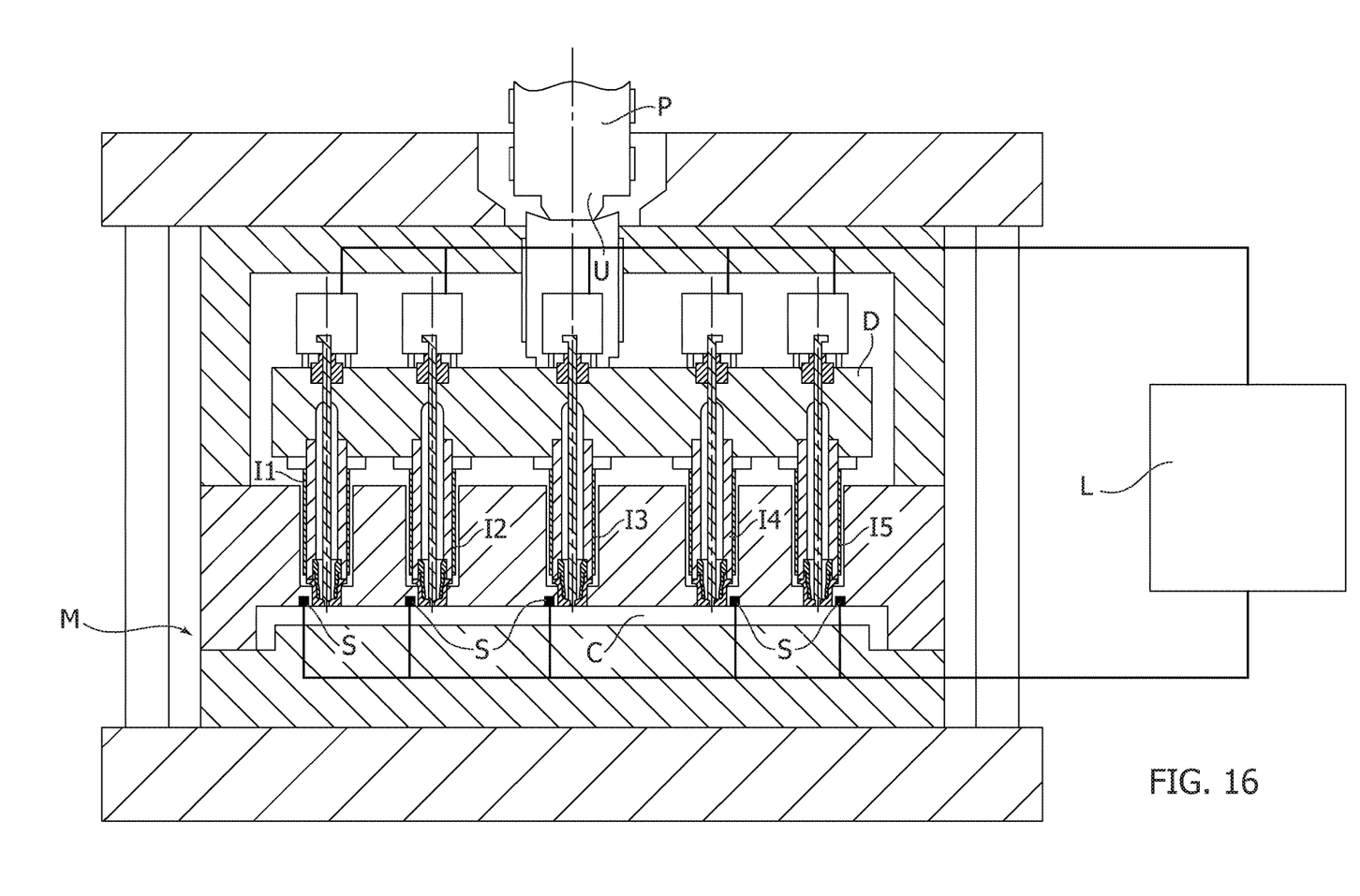

According to another advantageous variant, the invention may provide for combination with a closed-loop management software which links the displacement of the obturators of the various injectors to corresponding sensors. For example, let us consider pressure sensors S positioned in the cavity C of the mould M in proximity of an equal number of injection points, as schematised in FIG. 16. In this case, each sensor S sends—to an electronic control unit L—a respective signal regarding the moulding condition, which is analysed by a special software. If the target condition is not achieved, the software sends control signals to one or more obturators to automatically adjust the relative position/velocity/acceleration. In absence of mutual effect between the injectors, thanks to the invention, the "closed-loop" software will be simplified.

Thus, the advantages arising from the invention can summarised as follows:
- the moulding cycle is entirely controlled by each injector, by managing the position/velocity/acceleration of the respective obturator, without affecting the control of the pressure and/or flow rate of the other injectors: there is no mutual effect between the injectors,
- the moulding process is separated from the press, except for the initial setting of the injection pressure, then the entire process is controlled by directly managing the obturators of the single injectors,
- the transfer of a mould from one press to another is definitely much easier, given that it requires configuring much fewer parameters (shorter times),
- a system like FLEXflow, which enables managing the position/velocity/acceleration of the single obturators, is exploited even more efficiently,
- the flow simulations (e.g. filling the cavity of the mould) are much more reliable if there is no mutual effect between the injectors,
- in the case of "family moulding" the management of various cavities is simplified,
- in the case of a closed-loop management software, it will be simplified.

Obviously, the details and embodiments of the moulding apparatus and the injection press according to the invention may widely vary with respect to what has been described and illustrated by way of example, without departing from the scope of protection of the present invention as defined in the claims that follow.

The invention claimed is:

1. A method for injection moulding of plastic material for joint-moulded components of a same family, comprising:
   introducing the plastic material into multiple cavities of a single family mould in a filling step followed by packing the plastic material introduced into the single family mould during a subsequent packing step, wherein the filling step is performed by actuating a plurality of injectors in a sequential or cascade manner, the plurality of injectors being connected to one hot runner or distributor, which is connected to one injection press, the plurality of injectors each provided with respective valve pins movable between a closing position and an opening position in a controlled fashion with respect to at least one among position, velocity and acceleration;
   supplying the plastic material to the one distributor by the one injection press comprising a screw axially displaceable by an actuator, wherein the plastic material supplied to the distributor is at an injection pressure, and wherein said injection pressure is detected at an outlet of said screw upstream of an inlet of said distributor; and
   maintaining the injection pressure supplied to the one distributor substantially constant at an inlet to each of the injectors by said actuator from a start of the filling step up to an end of the plastic material packing step, whereby the injection press through variations of position and advancement velocity of the screw, automatically reacts to openings of each of the plurality of injectors and resulting pressure excursions based on at least said detected injection pressure to always provide the substantially constant injection pressure in the distributor such that controlling the injection pressure and/or flow rate flowing out from one of the plurality of injectors does not affect control of pressure and/or flow rate flowing out from the other injectors of the plurality of injectors;
   wherein said substantially constant injection pressure is a maximum pressure, which is a peak pressure regulated by the injection press during each molding cycle; and
   wherein one or more injectors of the plurality of injectors are associated to each of the cavities of the single family mould, wherein one or more of the cavities of the single family mould have different shapes and/or sizes and/or volumes, and wherein respective injectors associated to different cavities of the single family mould are controlled to provide different packing pressure and/or flow rates while the substantially constant injection pressure in the distributor is maintained.

2. The method according to claim 1, wherein said distributor is configured so that said injection pressure at an inlet of said injectors is substantially unvaried.

3. The method according to claim 1, wherein said filling and packing steps are managed exclusively by controlling at least one among position, velocity and acceleration of the valve pin of each injector.

4. The method according to claim 1, wherein said valve pins are actuated by respective electric motors.

5. The method according to claim 1, wherein said actuator of the injection press consists of a hydraulic cylinder whose piston moves said screw, and wherein said injection pressure is maintained substantially constant by the displacement of said piston.

6. The method according to claim 5, wherein said injection pressure is detected at an outlet of said screw upstream of an inlet of said distributor, and said piston is displaced so as to advance said screw when a decrease of said injection pressure is detected.

7. The method according to claim 5, wherein the hydraulic pressure within said cylinder or within a hydraulic circuit thereof is detected and said piston is displaced so as to advance said screw upon revealing a decrease of said hydraulic pressure.

8. An injection moulding apparatus configured to carry out the method according to claim 1.

9. An injection press comprising the screw rotatable and axially displaceable by the actuator of claim 1, wherein said actuator is controlled so as to implement the method according to claim 1.

* * * * *